(12) United States Patent
Harada et al.

(10) Patent No.: US 8,563,175 B2
(45) Date of Patent: Oct. 22, 2013

(54) NONAQUEOUS ELECTROLYTE BATTERY, ACTIVE MATERIAL, METHOD FOR PRODUCING SAME, METHOD FOR PRODUCING ALKALI TITANATE COMPOUND, AND BATTERY PACK

(75) Inventors: Yasuhiro Harada, Yokohama (JP); Norio Takami, Yokohama (JP); Hiroki Inagaki, Kawasaki (JP); Keigo Hoshina, Yokohama (JP); Yuki Otani, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/362,770

(22) Filed: Jan. 31, 2012

(65) Prior Publication Data

US 2012/0183836 A1 Jul. 19, 2012

Related U.S. Application Data

(63) Continuation of application No. PCT/JP2009/063699, filed on Jul. 31, 2009.

(51) Int. Cl.
*H01M 4/134* (2010.01)
*H01M 4/1395* (2010.01)
*H01M 4/48* (2010.01)

(52) U.S. Cl.
USPC ............... 429/231.5; 252/520.2; 423/610

(58) Field of Classification Search
USPC ............... 429/209–246; 252/520.2; 423/610
See application file for complete search history.

(56) References Cited

U.S. PATENT DOCUMENTS

| 3,789,096 A | * | 1/1974 | Church et al. | 264/122 |
| 6,306,796 B1 | * | 10/2001 | Suzue et al. | 502/350 |
| 2007/0292760 A1 | | 12/2007 | Patoux et al. | |
| 2009/0053605 A1 | | 2/2009 | Harada et al. | |

FOREIGN PATENT DOCUMENTS

| JP | 05-105447 | 4/1993 |
| JP | 2008-034368 | 2/2008 |
| JP | 2008-117625 | 5/2008 |
| JP | 2010-225487 | 10/2010 |
| WO | WO 2009/028553 | 3/2009 |
| WO | WO 2010/137154 A1 | 12/2010 |

OTHER PUBLICATIONS

A. Robert Armstrong et al., "TiO2—B nanowires as negative electrodes for rechargeable lithium batteries", Journal of Power Sources 146 (2005) 501-506.*

Carlos E. Bamberger et al., "Raman Spectroscopy of Potassium Titanates: Their Synthesis, Hydrolytic Reactions, and Thermal Stability", Applied Spectroscopy, 1990, vol. 44, No. 1.*

International Search Report issued Oct. 13, 2009 in PCT/JP2009/063699 filed Jul. 31, 2009.

(Continued)

*Primary Examiner* — Raymond Alejandro
*Assistant Examiner* — Helen McDermott
(74) *Attorney, Agent, or Firm* — Oblon, Spivak, McClelland, Maier & Neustadt, L.L.P.

(57) ABSTRACT

According to one embodiment, a negative electrode active material for a nonaqueous electrolyte battery is provided. The active material includes a titanium oxide compound having a crystal structure of a monoclinic titanium dioxide and having a crystallite, the crystallite having a crystallite size of 5 to 25 nm when it is calculated by using the half width of the peak of a (110) plane obtained by a powder X-ray diffraction (XRD) method using a Cu—Kα ray.

8 Claims, 8 Drawing Sheets

(56) References Cited

OTHER PUBLICATIONS

Minoru Inaba, et al., "$TiO_2(B)$ as a promising high potential negative electrode for large-size lithium-ion batteries"; Journal of Power Sources, 2009, vol. 189, No. 1, pp. 580-584.

René Marchand, et al.; "$TiO_2(B)$ A New Form of Titanium Dioxide and the Potassium Octatitanate $K_2Ti_8O_{17}$"; Material Research Bulletin, 1980, vol. 15, pp. 1129-1133.
U.S. Appl. No. 13/537,890, filed Jun. 29, 2012, Harada, et al.
Japanese Office Action issued Mar. 13, 2012, in Japan Patent Application No. 2011-524606 (with English translation).

* cited by examiner

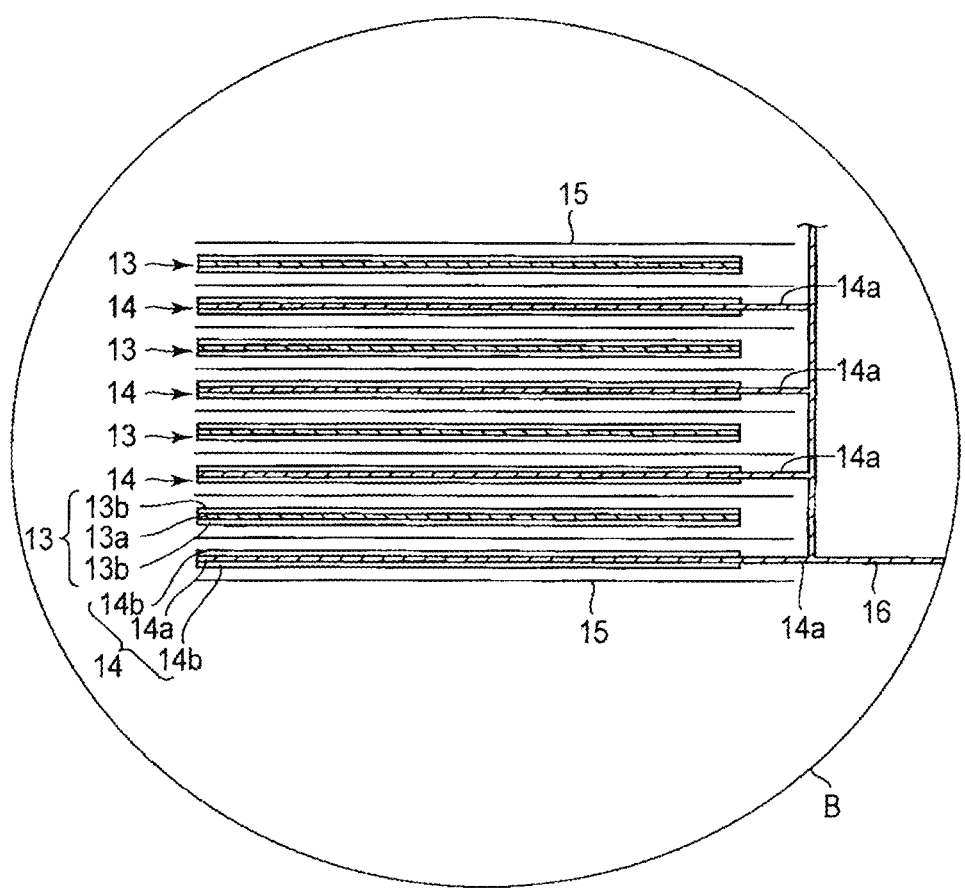
F I G. 5

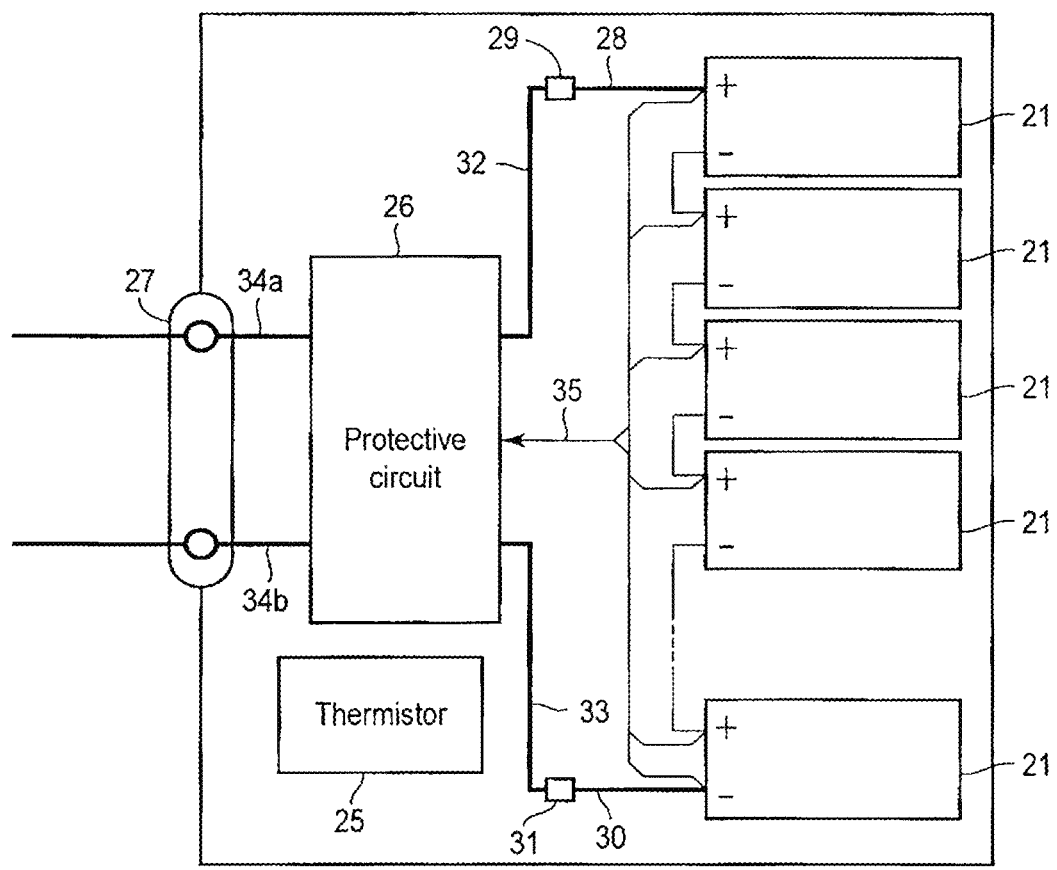
F I G. 7

F I G. 8A
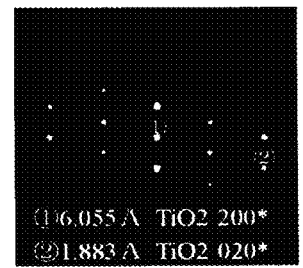
F I G. 8B
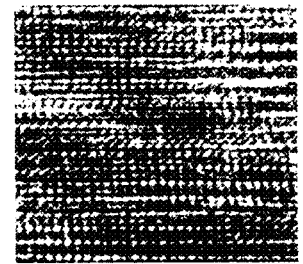
F I G. 9A

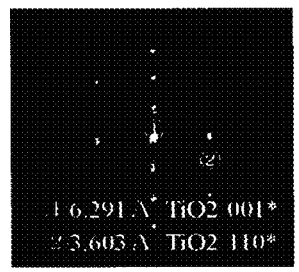
F I G. 9B
F I G. 10A
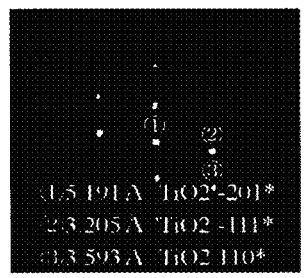
F I G. 10B

NONAQUEOUS ELECTROLYTE BATTERY, ACTIVE MATERIAL, METHOD FOR PRODUCING SAME, METHOD FOR PRODUCING ALKALI TITANATE COMPOUND, AND BATTERY PACK

CROSS REFERENCE TO RELATED APPLICATIONS

This application is a Continuation Application of PCT Application No. PCT/JP2009/063699, filed Jul. 31, 2009, the entire contents of which are incorporated herein by reference.

FIELD

Embodiments described herein relate generally to a nonaqueous electrolyte battery, active material, method for producing same, method for producing alkali titanate compound, and battery pack.

BACKGROUND

A battery using a titanium oxide in a negative electrode is capable of stable rapid charge-discharge, and has a longer lifetime than that of a battery using carbon-based negative electrode. However, a titanium oxide has a higher potential than carbonaceous material relative to metal lithium. Further, a titanium oxide has a lower capacity per mass. Thus, a battery using a titanium oxide in a negative electrode has a lower energy density.

For example, a potential of an electrode using a titanium oxide is about 1.5 V based on the metal lithium and is higher (i.e. nobler) than that of the electrode using a carbonaceous material. The potential of a titanium oxide is due to the redox reaction between $Ti^{3+}$ and $Ti^{4+}$ when lithium is electrochemically inserted and released and is therefore limited electrochemically. Further, there is the fact that the inserted and released of lithium ions by rapid charge/discharge is possible at an electrode potential as high as about 1.5 V. It is therefore substantially difficult to drop the potential of the electrode to improve energy density.

As to the capacity of the battery per unit mass, the theoretical capacity of titanium dioxide having an anatase structure is about 165 mAh/g and the theoretical capacity of a lithium-titanium composite oxide such as $Li_4Ti_5O_{12}$ is also about 170 mAh/g. On the other hand, the theoretical capacity of a general graphite-based electrode material is 385 mAh/g or more. Therefore, the specific energy density of lithium-titanium composite oxide based electrode is significantly lower than that of the carbonaceous material based electrode. This is due to a reduction in substantial capacity because there are only a small number of equivalent lithium-intercalation sites in the crystal structure and lithium tends to be stabilized in the structure.

On the other hand, in monoclinic titanium dioxide, the number of lithium ions which can be inserted and released per titanium ion is a maximum of 1.0. Accordingly, the theoretical capacity of monoclinic titanium dioxide is about 330 mAh/g. Therefore, it is expected that monoclinic titanium dioxide may be used as a high-capacity negative electrode active material. However, the actual capacity of a monoclinic titanium dioxide is significantly lower than the theoretical amount.

BRIEF DESCRIPTION OF THE DRAWINGS

FIG. 5 is an enlarged sectional view the B part of FIG. 4;

FIG. 7 is a block diagram showing an electric circuit of the battery pack of FIG. 6;

FIG. 8A is the TEM image of Example 4;

FIG. 8B is one of the FFT patterns of the high-resolution TEM image of Example 4;

FIG. 9A is the TEM image of Comparative Example 1;

FIG. 9B is one of the FFT patterns of the high-resolution TEM image of Comparative Example 1;

FIG. 10A is the TEM image of Comparative Example 2;

FIG. 10B is one of the FFT patterns of the high-resolution TEM image of Comparative Example 2.

DETAILED DESCRIPTION

In general, according to one embodiment, a negative electrode active material for a nonaqueous electrolyte battery is provided. The active material includes a titanium oxide compound having a crystal structure of a monoclinic titanium dioxide and having a crystallite, the crystallite having a crystallite size of 5 to 25 nm when it is calculated by using the half width of the peak of a (110) plane obtained by a powder X-ray diffraction (XRD) method using a Cu—Kα ray.

First Embodiment

The negative electrode active material for a nonaqueous electrolyte battery according to the first embodiment comprises a titanium oxide compound having a crystal structure of a monoclinic titanium dioxide. Said titanium oxide compound is characterized by that it has a crystallite having a size of 5 to 25 nm when the crystallite size is calculated by using the half width of the peak of a (110) plane obtained by a XRD method using a Cu—Kα ray.

The actual capacity of a monoclinic titanium dioxide is lower than the theoretical capacity. It is considered that the problem is caused by the reason that the diffusivity of Li ions in the crystal structure is poor despite many sites that can be Li hosts being present in the crystal structure, and thus effective movable Li ions are few. A symmetry such as space groups of a monoclinic titanium dioxide may vary in some cases since distortion is generated according to the amount or kind of intercalation. The present inventor has found for the first time that the diffusivity of Li ions in the crystal structure can be improved while maintaining an electrode potential of around 1.5 V based on the metal lithium by using the negative electrode active material according to the first embodiment, thereby improving actual capacity. Therefore, a nonaqueous electrolyte battery having a high energy density and excellent cycle performance can be attained.

Hereinafter the monoclinic titanium dioxide will be referred to as $TiO_2(B)$. The crystal structure of $TiO_2(B)$ mainly belongs to a space group C2/m, and has a tunnel structure as exemplified in FIG. 1. In addition, the detailed crystal structure of $TiO_2(B)$ intends the structure described in "R. Marchand, L. Brohan, M. Tournoux, Material Research Bulletin 15, 1129 (1980)".

Figure 1:
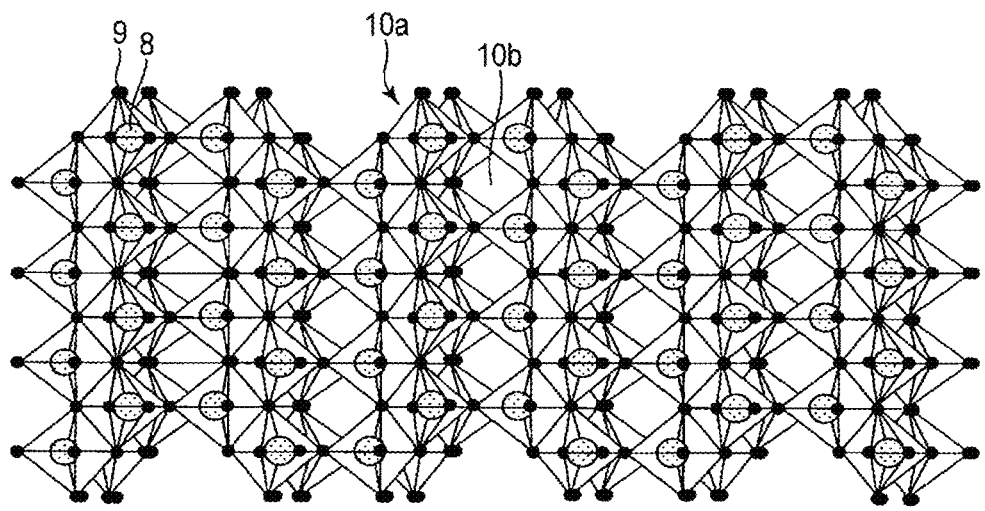
FIG. 1 is a schematic view showing the crystal structure of the monoclinic titanium dioxide.

As shown in FIG. 1, in the crystal structure of $TiO_2(B)$, titanium ions 8 and oxide ions 9 constitute backbone structure parts 10a. The plural backbone structure parts 10a are arranged alternately. A void part 10b is formed between the backbone structure parts 10a. This void part 10b can be a host site for intercalation (insertion) of a heterologous atomic species. It is said that host sites that can absorb and release a heterologous atomic species are also present on the crystal surface of $TiO_2(B)$. $TiO_2(B)$ can absorb or release lithium ions by insertion or release of lithium ions on these host sites.

When lithium ions are inserted in the void part 10b, $Ti^{4+}$ that constitutes the backbone is reduced to $Ti^{3+}$, thereby retaining the electrical neutrality of the crystal. Since $TiO_2(B)$ has one $Ti^{4+}$ per a chemical formula, it is theoretically possible to insert one lithium ion per a chemical formula at maximum. Therefore, a titanium oxide compound having a crystal structure of $TiO_2(B)$ can be represented by the general formula $Li_xTiO_2$ ($0 \leq x \leq 1$). In this case, a theoretical capacity of 335 mAh/g, which is approximately twice those of the titanium dioxides described in JP-A No. 2008-34368 and JP-A No. 2008-117625, can be obtained.

The present inventors have found that the actual capacity and cycle performance can be improved by using a titanium oxide compound having a crystal structure of $TiO_2(B)$ and a crystallite size of 5 to 25 nm.

When the crystal structure has the crystallite size in the range of 5 to 25 nm, the diffusion distance of the Li ions is shortened, thereby improving the diffusivity of Li ions in the crystal structure. Therefore the actual capacity can be increased. Further, Li ions may be trapped and immobilized in the crystal structure during charge-discharge cycles, thereby causing the decrease in actual capacity. When the diffusion distance of the Li ions is short, Li ions become difficult to be trapped since the diffusion pathway is simplified. As a result, irreversible capacity is decreased, thereby improving the cycle performance.

When the crystallite size is less than 5 nm, the crystallinity is decreased, and then the transfer property of the Li ions that are inserted in a crystal grid is significantly decreased. As a result, the actual capacity and charge-discharge efficiency are decreased. On the other hand, when the crystallite size is more than 25 nm, the diffusivity of Li ions is decreased since the diffusion distance of Li ions becomes long. As a result, the actual capacity and charge-discharge efficiency are decreased.

The crystallite size of the titanium oxide compound is calculated by Scherrer's equation using the half width of the peak of a (110) plane that appears around $2\theta=25°$ in a pattern obtained by a XRD method using a Cu—Kα ray. As used herein, around $2\theta=25°$ intends to mean the range of $2\theta$ from $23°$ to $27°$.

In addition, the titanium oxide compound is preferably a polycrystal in which primary particles are composed of a plurality of crystallites. Whether or not the primary particle is polycrystal can be confirmed by a high-resolution transmission electron microscope (TEM).

In this embodiment, it is further preferable that the above-mentioned titanium oxide compound has a spot in the range of 0.185 to 0.195 nm in a fast Fourier transform (FFT) analysis pattern using a high-resolution transmission electron microscopic image (multiwave interference image), and then comprises a crystal grown in the [020] direction.

Since the spot is present in said range in the FFT pattern using the high-resolution TEM image, it is understood that a (020) plane is mainly present in said titanium oxide compound. Therefore, it is understood that the crystal of said titanium oxide compound has been specifically grown in the [020] direction. Furthermore, since the spot is present in the above-mentioned range, it is understood that the plane spacing of the (020) plane of the crystal is in the range of 0.185 to 0.195 nm.

When the crystal has been grown isotropically, a spot corresponding to a (110) plane is mainly observed in the FFT pattern and the peak of the (110) plane is observed by XRD method as main peak.

In the titanium oxide compound according to the embodiment, the [020] direction is a direction to which Li ions transfer readily. Therefore, the transfer property of Li ions in the crystal structure can further be improved by making the crystal grow specifically in the [020] direction.

Furthermore, since the plane spacing of the (020) plane in the crystal is 0.185 nm or more, a sufficient space for Li ions to transfer is ensured. On the other hand, since the plane spacing is within 0.195 nm, distortion of the crystal is suppressed, and thus the transfer of Li ions is not inhibited.

Therefore, the titanium oxide compound having a spot in the range of 0.185 to 0.195 nm has a high transfer property of Li ions in the crystal structure, thereby being able to possess a high actual capacity and excellent cycle performance.

<XRD Measurement>

The XRD measurement of the active material is carried out in the following manner. First, a target sample is ground until the average particle diameter reaches about 5 μm. The average particle diameter can be found by the laser diffraction method.

The ground sample is filled in a holder part which is formed on a glass sample plate and has a depth of 0.2 mm. At this time, much care is necessary to fill the holder part fully with the sample. Further, special care should be taken to avoid cracking and formation of voids caused by insufficient filling of the sample.

Then, a separate glass plate is used to smooth the surface of the sample by sufficiently pressing the separate glass plate against the sample. Much care should be taken to avoid too mach or too little amount of the sample to be filled, thereby preventing any rises and dents in the basic plane of the glass holder.

Then, the glass plate filled with the sample is set to a powder X-ray diffractometer. The measurement is carried out by using Cu—Kα rays to obtain a XRD pattern. The crystallite size can be calculated from the half width of the peak of a (110) plane that appears around $2\theta=25°$ in the XRD pattern. In general, the crystallite size can be calculated from Scherrer's equation of the following formulas (1) and (2).

[Chemical formula 1]

$$L = \frac{K\lambda}{\beta \cos\theta} \quad (1)$$

$$\beta = \sqrt{\beta_e^2 - \beta_o^2} \quad (2)$$

wherein L is a crystallite size (nm), K=0.9, λ=0.15406 (nm), $\beta_e$ is the half width of the diffraction peak, and $\beta_o$ is a corrected value (0.07°) of the half width.

When the sample has a high orientation, it is likely that a certain peak intensity ratio is deviated by 50% or more from a standard peak intensity ratio described in the JCPDS cards that are standard databases of minerals in powder X-ray diffraction patterns. In the case, there is the possibility of a shift of a peak position and variation in intensity ratio, depending on how the sample is filled. In such a case, a sample is made into a pellet form for measurement. The pellet may be a compressed powder body for example, 10 mm in diameter and 2 mm in thickness. The compressed body may be manufactured by applying a pressure of about 250 MPa to the sample for 15 minutes. The obtained pellet is set to the X-ray diffractometer to measure the surface. The measurement using such a method eliminates a difference in the results of the measurement between operators, enabling high reproducibility. Alternatively, the sample is filled in a glass capillary. The glass capillary is set on a rotating stand and then the measurement is carried out. Such a method is more preferable because the orientation of the sample is alleviated.

<TEM Measurement>

The TEM measurement of the active material is carried out in the following manner.

In the case when the sample is a powder, it is desirable to embed the sample in a resin or the like, and scrape by a technique such as mechanical polishing or ion milling to expose the cross sectional of the inside. In the case when the sample is an electrode, the electrode itself is can be embedded in a resin. Alternatively, an electrode powder comprising the active material, a conductive material and a binder can be used as the sample. The electrode powder can be obtained by peeling a current collector (for example, metal foil) from an electrode. First, a desired portion of the sample is measured to obtain a multiwave interference image. Next, a region is selected randomly from the parts of the target particles (i.e., the particles of the titanium oxide compound) in the multiwave interference image. An electron beam diffraction pattern of the selected region is obtained, and a FFT analysis is conducted. Then, the FFT pattern of the high-resolution TEM image is observed whether or not a pattern corresponding to the (020) plane of the titanium oxide compound having a crystal structure of $TiO_2(B)$ can be found. Further, the plane spacing of the (020) plane is measured.

<Particle Diameter and BET Specific Surface Area>

It is said that an active material for an electrode has a higher capacity and that rapid charging and discharging can be conducted as the contact with an electrolyte increases and as the number of host sites increases. Therefore, a titanium oxide is atomized to improve rapid charge-discharge performances. The average particle size of the primary particles of the negative electrode active material according to the embodiment is not specifically limited and can be changed according to a desired battery property. Furthermore, although the BET specific surface area of the negative electrode active material according to the embodiment is not specifically limited, it is preferably 10 to 200 $m^2/g$.

When the specific surface area is 10 $m^2/g$ or more, a contact area with an electrolyte can be ensured. On the other hand, when the specific surface area is 200 $m^2/g$ or less, reactivity with an electrolyte is not too high, and thus the cycle performance can be improved. Furthermore, the coating of a slurry comprising an active material, which is used for the production of an electrode mentioned below, can be conducted easily.

Here, in the measurement of the specific surface area, a method comprising the following step is used:

a molecule of which the adsorption occupying area is known is made to adsorb to the surface of the powder particle at the temperature of liquid nitrogen; and the specific surface area of the powder particle is calculated from the amount of the molecule adsorbed on it. A method that is most frequently used to obtain the specific surface area is the BET method. The BET method uses the low-temperature and low-humidity physical adsorption of an inert gas and is based on the well-known theory for the calculating specific surface area. The theory is obtained by extending the Langmuir theory which is monolayer adsorption theory to multilayer adsorption. The specific surface area calculated in this manner is referred to as the "BET specific surface area".

Second Embodiment

As the second embodiment, a method for producing a titanium oxide compound for use in the negative electrode active material is explained in detail.

The method for the production according to the embodiment comprises the steps of: obtaining an anisotropically-grown alkali titanate compound; exchange an alkali cation of the alkali titanate compound for a proton by reacting the alkali titanate compound with an acid to give a proton-exchanged compound; and subjecting the proton-exchanged compound to heat treatment at a temperature of 300 to 500° C. to give a titanium oxide compound having a crystal structure of a monoclinic titanium dioxide and having a crystallite, the crystallite having a crystallite size of 5 to 25 nm, the crystallite size is calculated by using the half width of the peak of a (110) plane determined by a powder X-ray diffraction method using a Cu—Kα ray.

As a titanium-containing raw material, at least one titanium oxide selected from titanium oxides such as titanium dioxide having anatase structure, titanium dioxide having rutile structure or titanium dioxide having brookite structure may be used. As an alkali-containing raw material, at least one selected from the group of oxides such as potassium oxide, sodium oxide and cesium oxide, and the group of carbonates such as potassium carbonate, sodium carbonate or cesium carbonate may be used. A combination of titanium dioxide having anatase structure and potassium oxide is the most preferable since it is easily grown anisotropically in view of crystal structure. These raw materials are mixed according to a predetermined stoichiometric ratio and melted to give a molten product. The melting temperature is not specifically limited as long as it is greater than or equal to the melting point of the raw material mixture. However, it is preferably 1,200° C. or less so as to prevent evaporation of components such as potassium.

The molten product is then solidified by rapid cooling. During solidification, a difference in cooling speed within the planes of the molten product is generated, thereby cooling unidirectionally. Thus, a specific plane in a crystal can be selectively grown, that is to say an anisotropic crystal growth can be occurred. The molten product can be rapidly cooled unidirectionally by, for example, rapidly cooling only a specific surface of a cooling container. Specifically, for example, the molten product can be rapidly cooled unidirectionally by making the molten product flow over a cooling board. The obtained crystal is preferably washed with water or treated with an acid until composition ratio of alkali cation reaches that of an intended intermediate. In the case when the crystal forms an aggregation mass, it is preferable to conduct a loosing treatment.

The anisotropically-grown crystal is then subjected to heat treatment to give an intermediate (alkali titanate compound). The heat treatment is preferably sintering. The sintering temperature is preferably 1,200° C. or less so as to prevent evaporation of the components. Further, 800° C. or more is preferable so as to promote the rearrangement of the crystal. The sintering time is suitably determined depending on conditions such as the state of the crystal or the sintering temperature. The alkali titanate compound obtained as an intermediate may be, but is not limited to, for example, $Na_2Ti_3O_7$, $K_2Ti_4O_9$ or $Cs_2Ti_5O_{12}$.

The alkali titanate compound is then washed with distilled water to remove impurities. Thereafter the alkali titanate compound is reacted with an acid to exchange alkali cations for proton, thereby obtaining a proton-exchanged compound. The alkali cations of the alkali titanate compounds such as $Na_2Ti_3O_7$, $K_2Ti_4O_9$ or $Cs_2Ti_5O_{12}$ is exchangeable for protons without deteriorating the crystal structure by treating with an acid. For the acid treatment, acids such as hydrochloric acid, nitric acid or sulfuric acid having a concentration of 0.5 to 2 M can be used.

The acid treatment can be conducted by adding an acid to a powder of the alkali titanate compound and stirring. The acid treatment is preferably continued until alkali cations are sufficiently exchanged for protons. The time for the acid treatment is not specifically limited, but it is preferable to conduct for 24 hours or more when about 1M hydrochloric acid is used at room temperature (for example, around 25° C.). More preferably, the acid treatment is continued for about 1 to 2 weeks. Further, the acid solution is preferably replaced with a fresh one every 24 hours. If alkali cations such as potassium or sodium remain on the proton-exchanged compound, it causes decrease of charge-discharge capacities of battery. Therefore, it is preferable that almost all alkali cations are exchanged for protons. After the proton-exchange is completed, an alkaline solution such as an aqueous lithium hydroxide solution is optionally added to neutralize the residual acid. The obtained proton-exchanged compound is washed with distilled water, and then dried. The washing is sufficiently carried out until the pH of the washing liquid falls within the range of 6 to 8. The proton-exchanged compound thus obtained is a titanate proton compound.

Then, the proton-exchanged compound is subjected to heat treatment to give a titanium oxide compound having a crystal structure of $TiO_2(B)$, which is the final objective product. The heat treatment is preferably conducted by sintering. The sintering temperature is suitably determined depending on the proton-exchanged compound since the optimal temperature differs according to the conditions such as the composition, particle size or crystal form of the proton-exchanged compound, but it is preferably in the range of 300 to 500° C. When the temperature is 300° C. or more, the crystallinity is excellent, and the electrode capacity, charge-discharge efficiency and cycle property are also excellent. Meanwhile, when the temperature is 500° C. or less, the rearrangement of the atoms in the crystal is suitably suppressed, and thus the crystallite size does not become too large. Further, since generation of an impurity phase such as titanium dioxide having anatase structure is suppressed, decrease in electrode performance can be prevented.

The crystallite size can be controlled by adjusting the temperatures and times in the heat treatment of the anisotropically-grown crystal and the proton-exchanged compound, respectively. The higher the heating temperature and the longer the heating time are, the crystallite size tends to be larger and the plane spacing tends to be narrower. When the heating temperature is too high, other crystal planes also become easy to grow.

The sintering temperature is more preferably in the range of 320 to 350° C. since the crystallite size is easily controlled to the range of 5 to 25 nm. The heating time may be in the range of 2 to 3 hours, but is not limited to.

Further, as stated above, an alkali titanate compound having an anisotropically-grown crystal can be obtained by solidifying the molten product by unidirectional rapid cooling. The titanium oxide compound having a crystal structure of $TiO_2(B)$ and having a crystal grown specifically in the [020] direction can be synthesized by using such an alkali titanate compound having an anisotropically-grown crystal.

In conventionally-known synthesis methods as described in JP-A No. 2008-34368 and JP-A No. 2008-117625, an alkali titanate compound synthesized by a solid phase reaction method was used. Such an alkali titanate compound synthesized by a conventional method has uneven crystal forms since it includes particles having various forms. Therefore, when a titanium oxide compound is synthesized from such alkali titanate compound, crystal particles comprised in the titanium oxide compound have a variety of growth directions and readily form single-crystal like primary particles during sintering. Such a case is not preferable since a large crystallite is included in the titanium oxide compound, which also leads to increase in the diffusion distance of Li ions in the crystal structure and increase in an irreversible capacity.

However, according to the embodiment, a titanium oxide compound mentioned above can be synthesized by using an alkali titanate compound having an anisotropically-grown crystal and by controlling the sintering temperature. Li ions diffuse smoothly in the crystal structure of such a titanium oxide compound. Therefore, such a titanium oxide compound is advantageous for stably providing a high electrode capacity since.

The alkali titanate compound according to the embodiment is not limited to one synthesized by the above-mentioned method, and a commercially available one having an anisotropically-grown crystal may also be used.

Alternatively, a desired titanium oxide compound can be synthesized by, for example, a hydrothermal method. In the hydrothermal method, for example, a titanate proton compound having a crystal grown in a specific direction is synthesized by using titanium dioxide as a raw material, and the titanate proton compound is sintered to give a desired titanium oxide compound.

Hereinafter an example of the hydrothermal method is explained.

First, a titanium alkoxide is diluted with a solvent to prepare a titanium alkoxide solution. As the titanium alkoxide, for example, titanium tetraisopropoxide can be used. As the solvent, for example, ethanol or 2-propanol can be used. A mixed solution obtained by mixing pure water and ethanol (ethanol concentration: 20 to 50 wt %) is added dropwise to the titanium alkoxide solution. The titanium alkoxide is hydrolysed and gelatinize. The obtained gel is then heated at about 400 to 600° C. to give titanium oxide particles.

The obtained titanium oxide particles are then dispersed in an alkali solution to conduct a hydrothermal treatment. As the alkali solution, for example, an aqueous sodium hydroxide solution or aqueous lithium hydroxide solution can be used.

The hydrothermal treatment can be conducted by a conventionally-known procedure. For example, titanium oxide particles are dispersed in an alkali solution, and then, the solution are pressurized and heated by means of, for example, an autoclave pressure container. Under a high temperature and a high pressure, a hydrothermal synthesis is conducted. At this time, a titanate proton compound having at least one structure of a nanotube structure and a nanowire structure in which a specific crystal plane has been grown is generated. By subjecting such a titanate proton compound to heat treatment, a titanium oxide compound having an anisotropically-grown crystal can be synthesized.

By either method, a titanium oxide compound having a crystal structure of $TiO_2(B)$, having a crystallite of which a crystallite size being in the range of 5 to 25 nm and comprising a crystal grown in the [020] direction can be synthesized by controlling the heating temperature and time.

Third Embodiment

Next, the nonaqueous electrolyte battery according to the third embodiment will be explained in more detail with reference to the drawings. The same reference numeral is attached to a structure common to the embodiments and duplicated explanations are omitted here. Each drawing is a typical view for explaining the embodiment and for promoting the understanding of the embodiment. Though there are parts different from an actual battery in shape, dimension and ratio, these structural designs may be properly changed taking the following explanations and known technologies into consideration.

The nonaqueous electrolyte battery comprises a positive electrode, a negative electrode comprising the negative electrode active material according to the first embodiment, a nonaqueous electrolyte, a separator and a container.

Hereinafter the positive electrode, negative electrode, nonaqueous electrolyte, separator and exterior material are explained in detail.

1) Positive Electrode

The positive electrode comprises a current collector and a positive electrode layer (namely, positive electrode active material-containing layer). The positive electrode layer is formed on one or both surfaces of the current collector and contains a positive electrode active material, and optionally, a conductive agent and a binder.

Examples of the positive electrode active material include oxides, sulfides and a polymer. Specific examples of oxides and sulfides include manganese dioxide ($MnO_2$), iron oxide, copper oxide, and nickel oxide impregnated with lithium, lithium-manganese composite oxide (such as $Li_xMn_2O_4$ or $Li_xMnO_2$), lithium-nickel composite oxide (such as $Li_xNiO_2$), lithium-cobalt composite oxide (such as $Li_xCoO_2$), lithium-nickel-cobalt composite oxide (such as $LiNi_{1-y}Co_yO_2$), lithium-manganese-cobalt composite oxide (such as $Li_xMn_yCo_{1-y}O_2$), lithium-manganese-nickel composite oxide having a spinel structure ($Li_xMn_{2-y}Ni_yO_4$), lithium-phosphorous oxide having an olivine structure (such as $Li_xFePO_4$, $Li_xFe_{1-y}Mn_yPO_4$ and $Li_xCoPO_4$), iron sulfate [$Fe_2(SO_4)_3$], vanadium oxide (such as $V_2O_5$) and lithium-nickel-cobalt-manganese composite oxide. Here, x and y satisfy the following equations: $0<x\leq1$ and $0<y\leq1$.

As the active material, these compounds may be used either independently or in combinations of two or more.

Specific examples of the polymer include conductive polymer materials such as polyaniline or polypyrrole, or disulfide-based polymer materials. Sulfur (S) and carbon fluorides can also be used as the active material.

Preferable examples of the positive electrode active material include oxides having a high positive electrode voltage, for example, lithium-manganese composite oxide (for example, $Li_xMn_2O_4$), lithium-nickel composite oxide (for example, $Li_xNiO_2$), lithium-cobalt composite oxide (for example, $Li_xCoO_2$), lithium-nickel-cobalt composite oxide (for example, $LiNi_{1-y}Co_yO_2$), lithium-manganese-nickel composite oxide having a spinel structure (for example, $Li_xMn_{2-y}Ni_yO_4$), lithium-manganese-cobalt composite oxide (for example, $Li_xMn_yCo_{1-y}O_2$), Lithium-iron phosphate (for example, $Li_xFePO_4$) and lithium-nickel-cobalt-manganese composite oxide. Here, x and y satisfy the following equations: $0<x\leq1$ and $0<y\leq1$.

When a cold molten salt is used as the nonaqueous electrolyte, preferable examples of the active material include lithium-iron phosphate, $Li_xVPO_4F$ ($0\leq x\leq1$), lithium-manganese composite oxide, lithium-nickel composite oxide and lithium-nickel-cobalt composite oxide. Because each of these compounds is less reactive with a cold molten salt, the battery can be improved in cycle life.

The average primary particle diameter of the positive electrode active material is preferably 100 nm to 1 μm. A positive electrode active material having an average primary particle diameter of 100 nm or more is easily handled in industrial production. A positive electrode active material having an average primary particle diameter of 1 μm or less enables lithium ions to diffuse smoothly in the crystal structure.

The specific surface area of the positive electrode active material is preferably 0.1 $m^2$/g to 10 $m^2$/g. A positive electrode active material having a specific surface area of 0.1 $m^2$/g or more can secure lithium ion-absorption and release sites sufficiently. A positive electrode active material having a specific surface area of 10 $m^2$/g or less is easily handled in industrial production and ensures a good charge-discharge cycle performance.

The binder is formulated to bind the active material with the current collector. Examples of the binder include a polytetrafluoroethylene (PTFE), polyvinylidene fluoride (PVdF) and fluoro-rubber.

The conductive agent is formulated as required to improve the current collecting ability of the active material and to reduce the contact resistance between the active material and the current collector. Examples of the conductive agent include carbonaceous materials such as acetylene black, carbon black, or graphite.

The active material and binder in the positive electrode layer are preferably formulated in ratios of 80% by mass to 98% by mass and 2% by mass to 20% by mass respectively. When the amount of the binder is 2% by mass or more satisfactory electrode strength is obtained. Further, when the amount of the binder is 20% by mass or less, the amount of the insulating material of the electrode can be reduced, leading to reduced internal resistance.

When the conductive agent is added, the active material, binder and conductive agent are preferably formulated in ratios of 77% by mass to 95% by mass, 2% by mass to 20% by mass and 3% by mass to 15% by mass respectively. The conductive agent can produce the aforementioned effect by blending it in an amount of 3% by mass or more. When its amount is designed to be 15% by mass or less, on the other hand, the decomposition of the nonaqueous electrolyte on the surface of the conductive agent can be reduced even when the battery is stored at high temperatures.

The current collector is preferably made of an aluminum foil or aluminum alloy foil containing at least one element selected from Mg, Ti, Zn, Ni, Cr, Mn, Fe, Cu and Si.

The thickness of the aluminum foil or aluminum alloy foil is preferably 5 μm to 20 μm and more preferably 15 μm or less. The purity of the aluminum foil is 99% by mass or more. The content of transition metals such as Fe, Cu, Ni or Cr contained in the aluminum foil or aluminum alloy foil is preferably designed to be 1% by mass or less.

The positive electrode can be manufactured by, for example, suspending the positive electrode active material and binder and the conductive agent if necessary, in an appropriate solvent to prepare a slurry, by applying this slurry to the surface of the current collector and drying to form a positive electrode layer, which is then pressed.

Alternatively, the positive electrode can be manufactured by mixing the positive electrode active material and binder, and the conductive agent if necessary, forming the mixture into a pellet. The pellet can be used as the positive electrode layer. The pellet is placed on the current collector.

2) Negative Electrode

The negative electrode comprises a current collector and a negative electrode layer (namely, negative electrode active material-containing layer). The negative electrode layer is formed on one or both surfaces of the current collector and contains a negative electrode active material, and optionally, a conductive agent and a binder.

The negative electrode active material comprises the titanium oxide compound as explained in the first embodiment. The titanium oxide compound has a crystal structure of monoclinic titanium dioxide and has a crystallite size of 5 nm to 25 nm when the crystallite size is calculated by using the half width of the peak of a (110) plane obtained by a powder X-ray diffraction method using a Cu—Kα ray. Further, the titanium oxide compound preferably has a spot in the range 0.185 nm to 0.195 nm in a FFT analysis pattern using a high-resolution TEM image and comprises a crystal grown in the [020] direction.

As mentioned above, such titanium oxide compound is excellent in the diffusivity of lithium ions. Therefore, the negative electrode using the active material comprising said titanium oxide compound can improve the actual capacity of the nonaqueous electrolyte battery, and can improve charge-discharge cycle performance.

Though the active material according to the first embodiment may be singly used as the negative electrode active material, other compounds may be blended. Examples of these other compounds include titanium dioxide ($TiO_2$) having an anatase structure, lithium titanate having a ramsdelite structure (for example, $Li_2Ti_3O_7$) and lithium titanate having a spinel structure (for example, $Li_4Ti_5O_{12}$). These titanium oxide compounds can be used preferably since they have a specific gravity and the like that are close to those of the titanium oxide compound included in the active material according to the first embodiment, and are readily mixed and dispersed.

The conductive agent is formulated to improve the current-collecting performance and to restrain the contact resistance between the active material and the current collector. Examples of the conductive agent include carbonaceous material such as acetylene black, carbon black, or graphite.

The binder is blended to fill clearances between the dispersed negative electrode active materials and also to bind the active material with the current collector. Examples of the binder include a polytetrafluoroethylene (PTFE), polyvinylidene fluoride (PVdF), fluoro-rubber, and styrene-butadiene rubber.

The active material, conductive agent, and binder in the negative electrode layer are preferably blended in ratios of 68% by mass to 96% by mass, 2% by mass to 30% by mass and 2% by mass to 30% by mass respectively. When the amount of the conductive agent is 2% by mass or more, the current collecting performance of the negative electrode layer can be improved. Furthermore, when the amount of the binder is 2% by mass or more, the binding strength between the negative electrode layer and the current collector is satisfactory and excellent cycle performances may be expected. On the other hand, the amounts of the conductive agent and binder are respectively preferably 30% by mass or less with the view of developing a high-capacity battery.

As the current collector, a material which is electrochemically stable at the lithium absorption and release potential of the negative electrode active material is used. The current collector is preferably made of copper, nickel, stainless or aluminum, or an aluminum alloy containing at least one element selected from Mg, Ti, Zn, Mn, Fe, Cu, and Si. The thickness of the current collector is preferably 5 to 20 μm. A current collector having such a thickness can keep the balance between the strength of the negative electrode and light-weight performances.

The negative electrode can be manufactured by, for example, suspending the negative electrode active material, binder and conductive agent in a usual solvent to prepare a slurry, by applying this slurry to the surface of the current collector and by drying to form a negative electrode layer, which is then pressed.

Alternatively, the negative electrode can be manufactured by mixing the negative electrode active material, binder, and the conductive agent, forming the mixture into a pellet. The pellet can be used as the negative electrode layer. The pellet is placed on the current collector.

3) Nonaqueous Electrolyte

Examples of the nonaqueous electrolyte include a liquid nonaqueous electrolyte and a gel-like nonaqueous electrolyte. The liquid nonaqueous electrolyte is prepared by dissolving an electrolyte in an organic solvent. The gel-like nonaqueous electrolyte is prepared by forming a composite of a liquid electrolyte and a polymer material.

The liquid nonaqueous electrolyte is dissolved in an organic solvent in a concentration of 0.5 mol/L to 2.5 mol/L.

Examples of the electrolyte include lithium salts such as lithium perchlorate ($LiClO_4$), lithium hexafluorophosphate ($LiPF_6$), lithium tetrafluoroborate ($LiBF_4$), hexafluoro arsenic lithium ($LiAsF_6$), lithium trifluoromethasulfonate ($LiCF_3SO_3$), bistrifluoromethylsulfonylimide lithium [$LiN(CF_3SO_2)_2$], or mixtures of these compounds. The electrolyte is preferably one which is scarcely oxidized even at a high potential and $LiPF_6$ is most preferable.

Examples of the organic solvent include cyclic carbonates such as propylene carbonate (PC), ethylene carbonate (EC) or vinylene carbonate, chain carbonates such as diethyl carbonate (DEC), dimethyl carbonate (DMC) or methylethyl carbonate (MEC), cyclic ethers such as tetrahydrofuran (THF), 2-methyltetrahydrofuran (2MeTHF) or dioxolan (DOX), chain ethers such as dimethoxyethane (DME) or diethoethane (DEE), γ-butyrolactone (GBL), acetonitrile (AN) and sulfolan (SL). These organic solvents may be used either singly or in combinations of two or more.

Examples of the polymer material include a polyvinylidene fluoride (PVdF), polyacrylonitrile (PAN) and polyethylene oxide (PEO).

A cold molten salt (ionic melt) containing lithium ions, polymer solid electrolyte, inorganic solid electrolyte and the like may also be used as the nonaqueous electrolyte.

The cold molten salt (ionic melt) means compounds which can exist in a liquid state at normal temperature (15 to 25° C.) among organic salts constituted of combinations of organic cations and anions. The cold molten salts include those which singly exist in a liquid state, those which are put into a liquid state when mixed with an electrolyte and those which are put into a liquid state when dissolved in an organic solvent. Generally, the melting point of the cold molten salt used in a nonaqueous electrolyte battery is 25° C. or less. Further, the organic cation generally has a quaternary ammonium skeleton.

The polymer solid electrolyte is prepared by dissolving an electrolyte in a polymer material and by solidifying the electrolyte mixture.

The inorganic solid electrolyte is a solid material having lithium ion-conductivity.

4) Separator

The separator may be formed of a porous film comprising a polyethylene, polypropylene, cellulose or polyvinylidene fluoride (PVdF), or synthetic resin nonwoven fabric. Among these materials, a porous film formed of a polyethylene or polypropylene melts at a fixed temperature, making it possible to shut off current and is therefore preferable from the viewpoint of improving safety.

5) Exterior Material

A container made of a laminate film or a metal container may be used. The laminate film preferably has a thickness of 0.5 mm or less. The metal container preferably has a thickness of 1.0 mm or less. The thickness of the laminate film is more preferably 0.2 mm or less. The metal container has a thickness of, more preferably, 0.5 mm or less and most preferably 0.2 mm or less.

Examples of the shape of the container include a flat type (thin type), angular type, cylinder type, coin type and button type. The container having a size corresponding to the dimensions of a battery are used. For example, containers for small-sized batteries to be mounted on portable electronic devices and containers for large-sized batteries to be mounted on, for example, two- to four-wheel vehicles are used.

As the laminate film, a multilayer film prepared by interposing a metal layer between resin layers may be used. The metal layer is preferably formed of an aluminum foil or aluminum alloy foil to reduce the weight of the battery. For example, polymer materials such as polypropylene (PP), polyethylene (PE), nylon or polyethylene terephthalate (PET) may be used for the resin layer. The laminate film can be molded into a desired shape by sealing through thermal fusion.

The metal container is made of aluminum, an aluminum alloy or the like. The aluminum alloy is preferably an alloy containing one or more elements selected from Mg, Zn, and Si. When the alloy contains transition metals such as Fe, Cu, Ni and Cr, the amount of the transition metals is preferably 1% by mass or less. Thus, long-term reliability under high-temperature environment and thermal radiation property can be improved dramatically.

6) Nonaqueous Electrolyte Battery

Next, the nonaqueous electrolyte battery according to the third embodiment will be explained in more detail with reference to the drawings. The same reference numeral is attached to a structure common to the embodiments and duplicated explanations are omitted here. Each drawing is a typical view for explaining the embodiment and for promoting the understanding of the embodiment. Though there are parts different from an actual battery in shape, dimension and ratio, these structural designs may be properly changed taking the following explanations and known technologies into consideration.

Figure 2:
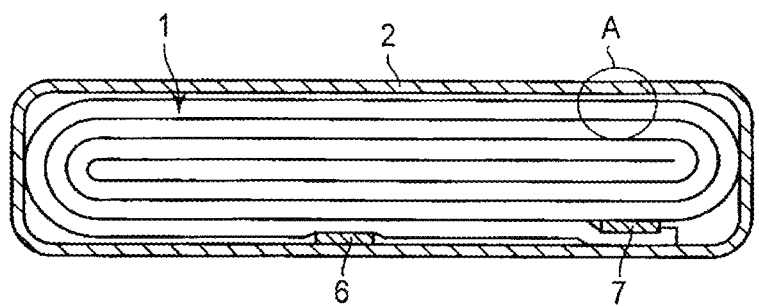
FIG. 2 is a sectional view of the flat type nonaqueous electrolyte battery according to a third embodiment.
Figure 3:
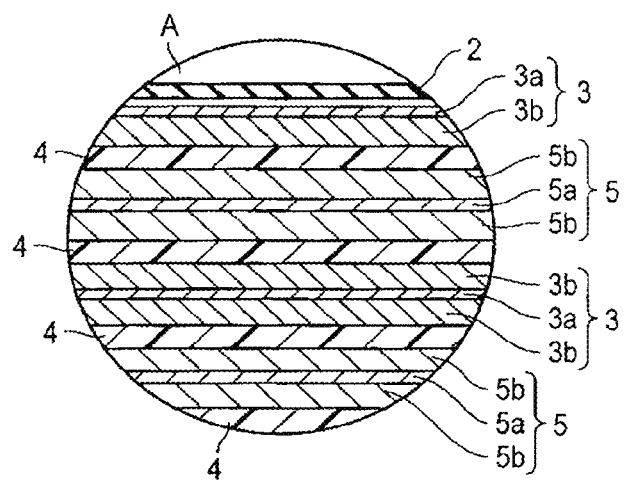
FIG. 3 is an enlarged sectional view of the A-part of FIG. 2.

FIG. 2 is a sectional view of a flat type nonaqueous electrolyte secondary battery. FIG. 3 is an enlarged sectional view of the A-part of FIG. 2.

A flat type coil electrode group 1 is accommodated in a baggy container 2 made of a laminate film obtained by interposing an aluminum foil between two resin layers. The coil electrode groups 1 having a flat form are formed by spirally coiling a laminate obtained by laminating a negative electrode 3, a separator 4, a positive electrode 5 and a separator 4 in this order from the outside and by press-molding the coiled laminate.

The negative electrode 3 comprises a negative electrode current collector 3a and a negative electrode layer 3b. The negative electrode layer 3b comprises a negative electrode active material mentioned above. The outermost negative electrode 3 has a structure in which a negative electrode layer 3b is formed on one inside surface of a negative electrode current collector 3a as shown in FIG. 3. Other negative electrodes 3 each have a structure in which a negative electrode layer 3b is formed on each surface of the current collector 3a.

The positive electrode 5 comprises a positive electrode current collector 5a and a positive electrode layer 5b. The positive electrode layer 5b is formed on each surface of a positive electrode current collector 5a.

In the vicinity of the outer peripheral end of the coil electrode group 1, a negative electrode terminal 6 is connected to the negative electrode current collector 3a of the outermost negative electrode 3 and a positive electrode terminal 7 is connected to the positive electrode current collector 5a of the inside positive electrode 5. The negative electrode terminal 6 and positive electrode terminal 7 are externally extended from an opening part of the baggy container 2. A liquid nonaqueous electrolyte is injected from the opening part of the baggy container 2. The opening part of the baggy container 2 is closed by heat sealing with the negative electrode terminal 6 and positive electrode terminal 7 extended out of the opening part to thereby perfectly seal the coil electrode group 1 and liquid nonaqueous electrolyte.

The negative electrode terminal 6 is made of, for example, a material having electric stability at the Li-absorption and release potential of the negative electrode active material and has conductivity. Specifically, examples of these materials include copper, nickel, stainless and aluminum, or an aluminum alloy containing an element such as Mg, Ti, Zn, Mn, Fe, Cu or Si. The negative electrode terminal 6 is preferably made of the same material as the negative electrode current collector 3a to reduce the contact resistance with the negative electrode current collector.

The positive electrode terminal 7 is made of, for example, a material having electric stability in a potential range from, preferably 3 to 5 V, more preferably 3.0 to 4.25 V relative to a lithium ion metal and conductivity. Specific examples of these materials include aluminum and aluminum alloy containing an element such as Mg, Ti, Zn, Ni, Cr, Mn, Fe, Cu or Si. The positive electrode terminal 7 is preferably made of the same material as the positive electrode current collector 5a to reduce the contact resistance with the positive electrode current collector 5a.

Figure 4:
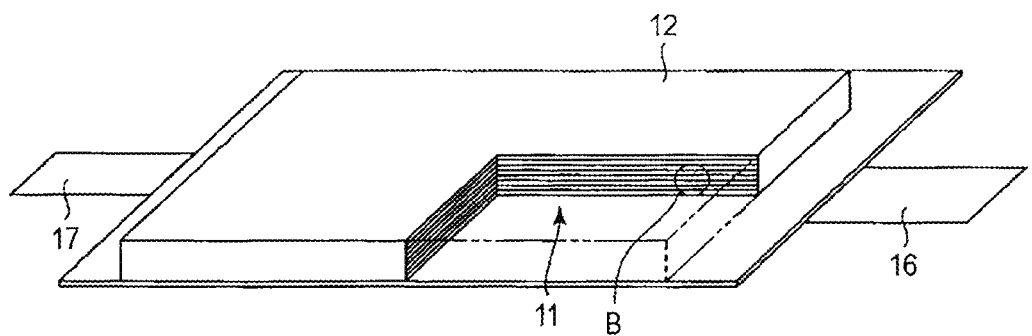
FIG. 4 is a schematic view of another flat type nonaqueous electrolyte battery according to a third embodiment.

FIG. 4 shows another example of the nonaqueous electrolyte battery according to the third embodiment. FIG. 4 is a partly broken perspective view of the flat-type nonaqueous electrolyte battery. FIG. 5 is an enlarged sectional view of the B part of FIG. 4.

A laminate type electrode group 11 is accommodated in a container 12 made of a laminate film obtained by interposing a metal layer between two resin layer. The laminate type electrode group 11 has a structure in which a positive electrode 13 and a negative electrode 14 are, as shown in FIG. 5, alternately laminated with a separator 15 interposed therebetween. The positive electrodes 13 exist in plural, each being provided with a current collector 13a and a positive electrode active material-containing layer 13b formed on each side of the current collector 13a. The negative electrodes 14 exist in plural, each being provided with a current collector 14a and a negative electrode active material-containing layer 14b carried on each side of the current collector 14a. One side of the current collector 14a of each negative electrode 14 is projected from the positive electrode 13. The projected current collector 14a is electrically connected to a band-shaped negative electrode terminal 16. The end of the band-shaped negative electrode terminal 16 is externally drawn out of the container 12. Further, of the current collector 13a of the positive electrode 13, the side positioned opposite to the projected side of the current collector 14a is projected from the negative electrode 14. The current collector 13a projected from the negative electrode 14 is electrically connected to a band-shaped positive electrode terminal 17. The end of the band-shaped positive electrode terminal 17 is positioned opposite to the negative electrode terminal 16 and drawn out of the side of the container 12.

According to the above embodiment, a nonaqueous electrolyte battery having a high energy density and excellent cycle performance can be provided.

Fourth Embodiment

Next, a battery pack according to a fourth embodiment will be explained with reference to the drawings. The battery pack comprises one or two or more of the above nonaqueous electrolyte batteries (unit cells) according to the third embodiment. When the battery pack includes two or more unit cells, these unit cells are disposed in such a manner that they are electrically connected in series or in parallel.

Figure 6:
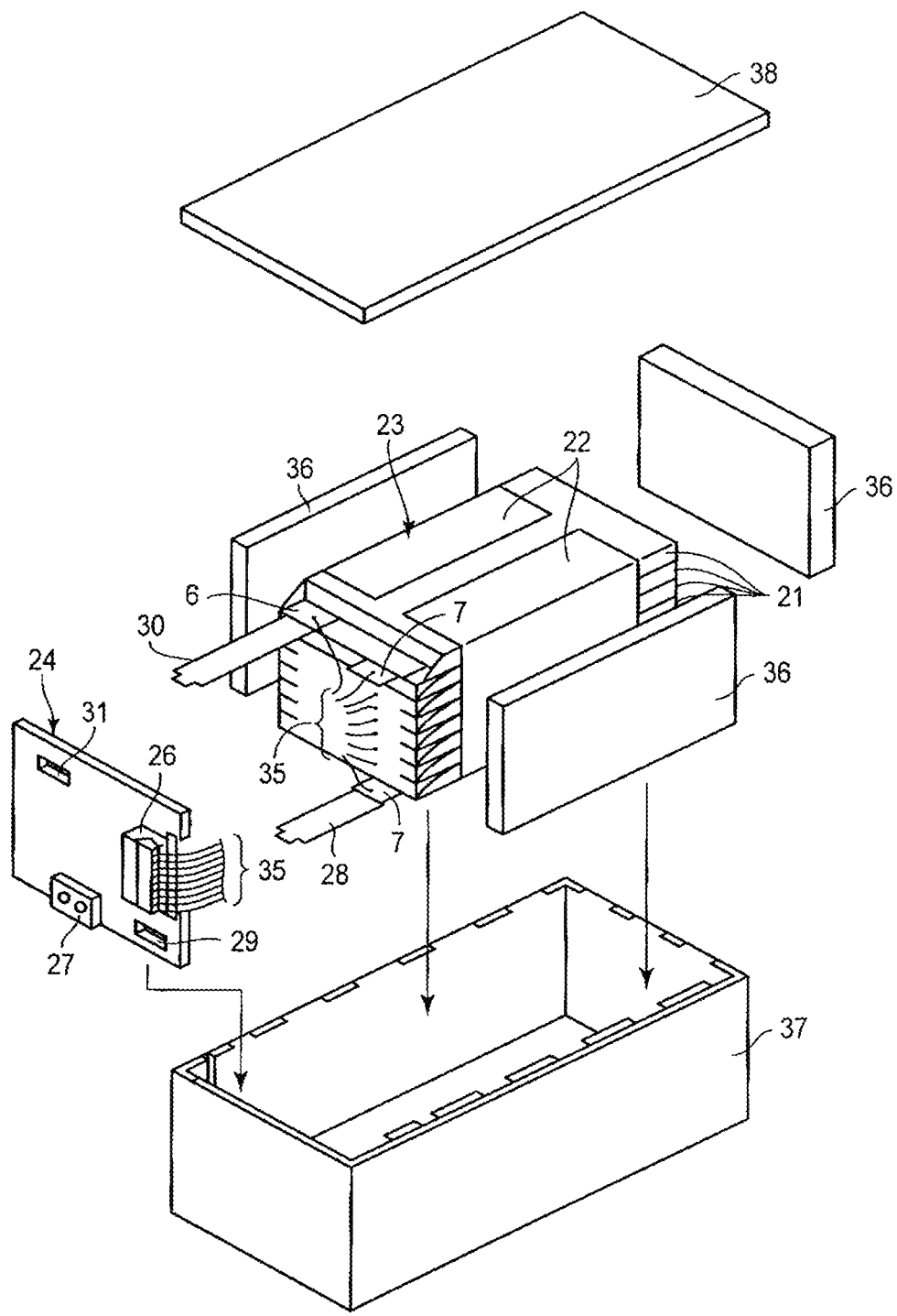
FIG. 6 is an exploded perspective view of a battery pack according to a fourth embodiment.

FIG. 6 and FIG. 7 show an example of a battery pack. This battery pack comprises two or more flat-type unit cells 21 each having the structure shown in FIG. 2. FIG. 6 is an exploded perspective view of the battery pack. FIG. 7 is a block pattern showing the electric circuit of the battery pack shown in FIG. 6.

A plurality of unit cells 21 are laminated such that the externally extended negative electrode terminal 6 and positive electrode terminal 7 are arranged in the same direction and fastened with an adhesive tape 22 to thereby constitute a battery module 23. These unit cells 21 are electrically connected in series as shown in FIG. 7.

A printed wiring board 24 is disposed opposite to the side surface of the unit cell 21 from which the negative electrode terminal 6 and positive electrode terminal 7 are extended. As shown in FIG. 7, a thermistor 25, a protective circuit 26 and an energizing terminal 27 connected to external devices are mounted on the printed wiring board 24. An insulating plate (not shown) is attached to the surface of the protective circuit substrate 24 facing the battery module 23 to avoid unnecessary connection with the wiring of the battery module 23.

A positive electrode side lead 28 is connected to the positive electrode terminal 7 positioned on the lowermost layer of the battery module 23 and one end of the positive electrode side lead 28 is inserted into and electrically connected to a positive electrode side connector 29 of the printed wiring board 24. A negative electrode side lead 30 is connected to the negative electrode terminal 6 positioned on the uppermost layer of the battery module 23 and one end of the negative electrode side lead 30 is inserted into and electrically connected to a negative electrode side connector 31 of the printed wiring board 24. These connectors 29 and 31 are connected to the protective circuit 26 through wirings 32 and 33 formed on the printed wiring board 24.

The thermistor 25 is used to detects the temperature of the unit cell 21 and the detected signals are transmitted to the protective circuit 26. The protective circuit 26 can shut off a plus side wiring 34a and minus side wiring 34b between the protective circuit 26 and the energizing terminal 27 connected to external devices in a predetermined condition. The predetermined condition means, for example, the case where the temperature detected by the thermistor 25 is a predetermined one or higher. Also, the predetermined condition means, for example, the case of detecting overcharge, overdischarge and over-current of the unit cell 21. The detections of this overcharge and the like are made for individual unit cells 21 or whole unit cells 21. When individual unit cells 21 are detected, either the voltage of the battery may be detected or the potential of the positive electrode or negative electrode may be detected. In the latter case, a lithium electrode used as a reference electrode is inserted between individual unit cells 21. In the case of FIG. 6 and FIG. 7, a wiring 35 for detecting voltage is connected to each unit cell 21 and the detected signals are transmitted to the protective circuit 26 through these wirings 35.

A protective sheet 36 made of a rubber or resin is disposed on each of the three side surfaces of the battery module 23 excluding the side surface from which the positive electrode terminal 7 and negative electrode terminal 6 are projected.

The battery module 23 is accommodated in a receiving container 37 together with each protective sheet 36 and printed wiring board 24. Specifically, the protective sheet 36 is disposed on each inside surface in the direction of the long side and on one of the inside surfaces in the direction of the short side of the receiving container 37, and the printed wiring board 24 is disposed on the other inside surface in the direction of the short side. The battery module 23 is positioned in a space enclosed by the protective sheet 36 and the printed wiring board 24. A lid 38 is attached to the upper surface of the receiving container 37.

Here, a thermally contracting tape may be used in place of the adhesive tape 22 to secure the battery module 23. In this case, after the protective sheet is disposed on both sides of the battery module and the thermally contracting tubes are wound around the battery module; the thermally contracting tape is contracted by heating to fasten the battery module.

The structure in which the unit cells 21 are connected in series is shown in FIG. 6 and FIG. 7. However, these unit cells may be connected in parallel to increase the capacity of the battery. The assembled battery packs may be further connected in series or in parallel.

Also, the structure of the battery pack is appropriately changed according to its use. The battery pack is preferably used in applications exhibiting excellent cycle performances when a large current is extracted. Specific examples of these applications include power sources for digital cameras, and power sources mounted on vehicles such as two- to four-wheel vehicles hybrid electric cars, two- to four-wheel electric cars or assist bicycles. The battery pack is preferably used for power sources mounted on vehicles.

According to these embodiments, a battery pack having a high energy density and excellent cycle performance can be provided.

EXAMPLES

The embodiment will be explained in more detail by way of examples, but the embodiment is not limited to only these examples. The identification of the crystal phase and estimation of crystal structure of the synthesized product were made by the XRD method using Cu—K$\alpha$ rays. The crystallite size was calculated by Scherrer's equation shown in the first embodiment by using the half width of the peak of a (110) plane. Further, in order to examine the growth direction of the crystal, a high-resolution TEM image (multiwave interference image) was obtained and subjected to a FFT analysis. The composition of the product was analyzed by the ICP method to confirm whether a target product was obtained or not.

Synthesis of Examples 1 to 4

Potassium titanate was synthesized by a melting method, and titanium oxide compounds each having a crystal structure of $TiO_2(B)$ were synthesized by using the synthesized potassium titanate.

As raw material, potassium carbonate and titanium dioxide were used. These compounds were mixed by a composition ratio that gives $K_2Ti_2O_5$. This mixture was put into a crucible made of platinum and melted by heating to 1,150° C. This molten product was flowed over a cooling board made of platinum in order to cool it rapidly, thereby solidifying it. As a result, a crystal grown anisotropically was obtained. The aggregation mass of the crystal was washed with distilled water and subjected to a loosing treatment. By these treatments, a fiber-like crystal from which potassium had been removed was obtained. The reason that the crystal was fiber form is that the crystal was grown anisotropically and was extended in a specific direction.

The crystal was then sintered for 2 hours at temperatures of 800° C. (Example 1), 850° C. (Example 2), 950° C. (Example 3) and 1,050° C. (Example 4), respectively, to give powders of alkali titanate compounds.

The obtained alkali titanate compound was then subjected to proton-exchange. Specifically, the powder of the alkali titanate compound was added to a 1 M solution of hydrochloric acid and stirred at 25° C. for 2 weeks. At that time, the 1 M solution of hydrochloric acid was replaced with new one every 24 hours.

Since the suspension obtained by proton-exchange had fine dispersibility, it was difficult to be separated by filtration. Therefore, the suspension was centrifuged to separate the solvent and solid content. The obtained solid content is a proton-exchanged compound; $H_2Ti_4O_9$. The powder of the proton-exchanged compound was washed with distilled water until the pH of the washing liquid became 6 to 7.

The proton-exchanged compound $H_2Ti_4O_9$ was then sintered at a temperature of 350° C. for 3 hours. In order to obtain a exact thermal history, the proton-exchanged compound was put in an electric furnace at a predetermined temperature, and removed from the furnace immediately after heating and cooled rapidly in air. The sintered product was put in vacuum of 80° C. and dried for 12 hours to give an objective titanium oxide compound having a crystal structure of $TiO_2(B)$.

The obtained titanium oxide compound was subjected to a powder XRD analysis. The crystallite size was calculated from the result thereof by means of Scherrer's equation. The result thereof was shown in Table 1.

Further, a high-resolution TEM image was obtained. FFT analysis was conducted for 10 measurement points that were selected randomly from the TEM image, thereby obtaining FFT patterns of the high-resolution TEM image. As an example, the high-resolution TEM image of Example 4 is shown in FIG. 8A, and one of the FFT patterns of the high-resolution TEM image is shown in FIG. 8B.

As a result of the analysis, a spot corresponding to the (020) plane was confirmed on the most of the analysis patterns on the 10 measurement points in all of Examples 1 to 4. Therefore, it was confirmed that the crystal had been grown specifically in the [020] direction in the obtained titanium oxide compounds. Further, the (020) plane spacing was measured in each analysis pattern. For example, it is understood that the spacing of the (020) plane is 0.1883 nm in the analysis pattern of FIG. 8B. The average of the plane spacings of the (020) plane in the respective measurement points was shown in Table 1.

Synthesis of Comparative Example 1

As Comparative Example 1, a titanium oxide compound having a crystal structure of $TiO_2(B)$ was synthesized according to the solid phase reaction method described in JP-A No. 2008-34368.

Potassium nitrate and titanium dioxide having anatase structure were mixed by a predetermined ratio, and heated at 1,000° C. for 24 hours to give $K_2Ti_4O_9$. This compound was then put in a 1 M aqueous solution of nitric acid and stirred at an room temperature for 12 hours. The obtained powder was washed several times with distilled water and heated at 400° C. for 3 hours to give the titanium oxide compound having a crystal structure of $TiO_2(B)$ as described in JP-A No. 2008-34368.

The obtained titanium oxide compound was analyzed by powder XRD using Cu—Kα as a ray source. As a result, a diffraction line having a peak of a (110) plane as a main peak, which was similar to ASTM Card No. 35-0088, was obtained. Any specific orientation was not observed. The crystallite size of the obtained titanium oxide compound was calculated in a similar manner to that in the above-mentioned Examples. The result thereof was shown in Table 1.

Further, a high-resolution TEM image was obtained and subjected to FFT analysis. In the FFT pattern of the high-resolution TEM image, a spot corresponding to the (020) plane was examined. FIG. 9A is the high-resolution TEM image of Comparative Example 1, and FIG. 9B is one of the FFT patterns of the high-resolution TEM image of Comparative Example 1. On the 10 measurement points that were optionally selected from the TEM image of Comparative Example 1, the spot corresponding to the (020) plane was observed little and the spot corresponding to the (110) plane was mainly observed.

Therefore, it was presumed that the crystal of Comparative Example 1 did not specifically show anisotropicity and had not been grown specifically in (020). This result conforms to the result obtained from the powder XRD analysis. In addition, since the crystal had not been grown specifically on the (020) plane in Comparative Example 1, the spacing of the (020) plane could not be measured.

Synthesis of Comparative Example 2

As Comparative Example 2, a titanium oxide compound having a crystal structure of $TiO_2(B)$ was synthesized according to the synthesis method described in JP-A No. 2008-117625.

A sodium carbonate powder and a titanium dioxide powder, which are raw materials for reagents with high purity, were weighed and mixed so that they had a molar ratio of Na:Ti=2:3. Then, heating at 800° C. for 20 hours was conducted twice to give $Na_2Ti_3O_7$ polycrystal. This polycrystal was soaked in a 0.5 M hydrochloric acid solution and retained at room temperature for 5 days to conduct proton-exchange. The polycrystal was thereafter washed with water and dried in vacuum at a temperature of 120° C. for 24 hours to give a precursor, namely a proton-exchanged compound: $H_2Ti_3O_7$ polycrystal.

The obtained $H_2Ti_3O_7$ polycrystal was then heated in air at a temperature of 320° C. for 20 hours to give the titanium oxide compound having a crystal structure of $TiO_2(B)$ as described in JP-A No. 2008-117625.

The obtained titanium oxide compound was analyzed by powder XRD using Cu—Kα as a ray source. As a result, a diffraction line having a peak of a (110) plane as a main peak, which was similar to ASTM Card No. 35-0088, was obtained. Any specific orientation was not observed. The crystallite size of the obtained titanium oxide compound was calculated in a similar manner to that in the above-mentioned Examples. The result thereof was shown in Table 1.

Furthermore, a high-resolution TEM image was obtained and subjected to a FFT analysis. In the FFT pattern of the high-resolution TEM image, a spot corresponding to the (020) plane was examined. FIG. 10A is the high-resolution TEM image of Comparative Example 2, and FIG. 10B is one of the FFT patterns of the high-resolution TEM image of Comparative Example 2. On the 10 measurement points that were optionally selected from the TEM image of Comparative Example 2, the spot corresponding to the (020) plane was observed little and the spot corresponding to the (110) plane was mainly observed.

Therefore, it was presumed that the crystal of Comparative Example 2 did not specifically show anisotropicity and had not been grown specifically in (020). This result conforms to the result obtained from the powder XRD analysis. In addition, since the crystal had not been grown specifically on the (020) plane in Comparative Example 2, the spacing of the (020) plane could not be measured.

<Electrochemical Measurement>

Using the titanium oxide compounds obtained in Examples and Comparative Examples, electrochemical measurement cells were constituted. A metal lithium foil was used as a counter electrode for the electrode using the titanium oxide compound. In this case, the electrode potential of the titanium oxide compound is nobler than that of the counter electrode. Therefore, the direction of charging and discharging is opposite to that in the case when the electrode using titanium oxide compound is used as a negative electrode of a lithium ion battery. In order to avoid confusion, in this example, the situation where lithium ions is inserted into the electrode using the titanium oxide compound is referred to as charging, and the situation where lithium ion is released from the electrode is referred to as discharging. An electrolyte was prepared by dissolving lithium perchlorate in a mixed solvent of ethylene carbonate and diethyl carbonate having a volume ratio of 1:1 at a concentration of 1 M.

As mentioned above, since metallic lithium was used in the negative electrode in this example, the electrode using the titanium oxide compound was made to function as a positive electrode, but it is also naturally possible to make the electrode using the titanium oxide compound function as a negative electrode by combining it with a conventionally-known positive electrode material.

A charge-discharge test was conducted on each of Examples 1 to 4 and Comparative Examples 1 and 2. The charging and discharging were conducted under the conditions of a potential range of 1.0 to 3.0 V on the basis of a metal lithium electrode, a charge and discharge current of 0.05 mA/cm² and room temperature. The charge and discharge curves of Examples 1 to 4 and Comparative Examples 1 and 2, respectively, were shown in FIG. 11.

Next, a first cycle discharge capacity, and a first cycle charge-discharge efficiency were measured. The charging and discharging were conducted at a potential range of 1.0 to 3.0 V on the basis of a metal lithium electrode, a current of 0.05 mA/cm² and room temperature. Further, charging and discharging were repeated for 50 cycles, wherein charging/discharging was considered as one cycle, and thereafter a discharge capacity was measured. A discharge capacity maintenance ratio after 50 cycle was calculated when a first cycle discharge capacity was set as 100. The results thereof are shown in Table 1.

TABLE 1

| | Crystallite size (nm) | Spacing of (020) plane (nm) | First cycle discharge capacity (mAh/g) | First cycle charge-discharge efficiency (%) | Discharge capacity maintenance ratio after 50 cycles (%) |
|---|---|---|---|---|---|
| Example 1 | 7.2 | 0.1937 | 212.4 | 87.5 | 96.1 |
| Example 2 | 12.4 | 0.1905 | 228.7 | 91.3 | 97.3 |
| Example 3 | 18.1 | 0.1890 | 245.2 | 91.2 | 98.3 |
| Example 4 | 23.6 | 0.1883 | 217.3 | 90.8 | 98.7 |
| Comparative Example 1 | 36.5 | — | 192.6 | 83.6 | 94.8 |
| Comparative Example 2 | 42.3 | — | 163.8 | 84.0 | 95.5 |

As shown in Table 1, the first cycle discharge capacities of Examples 1 to 4 were higher than those of Comparative Examples 1 and 2. The difference was reached about 10 to 50%. Therefore, it was shown that the titanium oxide compounds that were synthesized according to the method of the above embodiment had a higher actual capacity than those of titanium oxide compounds that were prepared according to conventional methods.

Specifically, the first cycle discharge capacity was high in Example 2 having a crystallite size of 12.4 nm and Example 3 having a crystallite size of 18.1 nm. This is considered to be attributed to the diffusivity of Li ions in the crystal structure being high in Examples 2 and 3 since Examples 2 and 3 had better crystal properties than that of Example 1 and had smaller crystallite sizes than that of Example 4.

Further, the first cycle discharge capacities of Examples 1 to 4 were higher than those of Comparative Examples 1 and 2. This is considered to be attributed to the irreversible capacity being decreased as a result of improvement of the diffusivity of the Li ions in the crystal structure. Similarly to the first cycle discharge capacity, the first cycle charge-discharge efficiency was specifically high in Examples 2 and 3.

Further, the discharge capacity maintenance ratios after 50 cycles of Examples 1 to 4 were also higher than those of Comparative Examples 1 and 2. Therefore, it was shown that Examples 1 to 4 can be charged and discharged stably for a long term.

Therefore, it was shown that Examples 1 to 4 had a high actual capacity and excellent charge-discharge performances.

Figure 11:
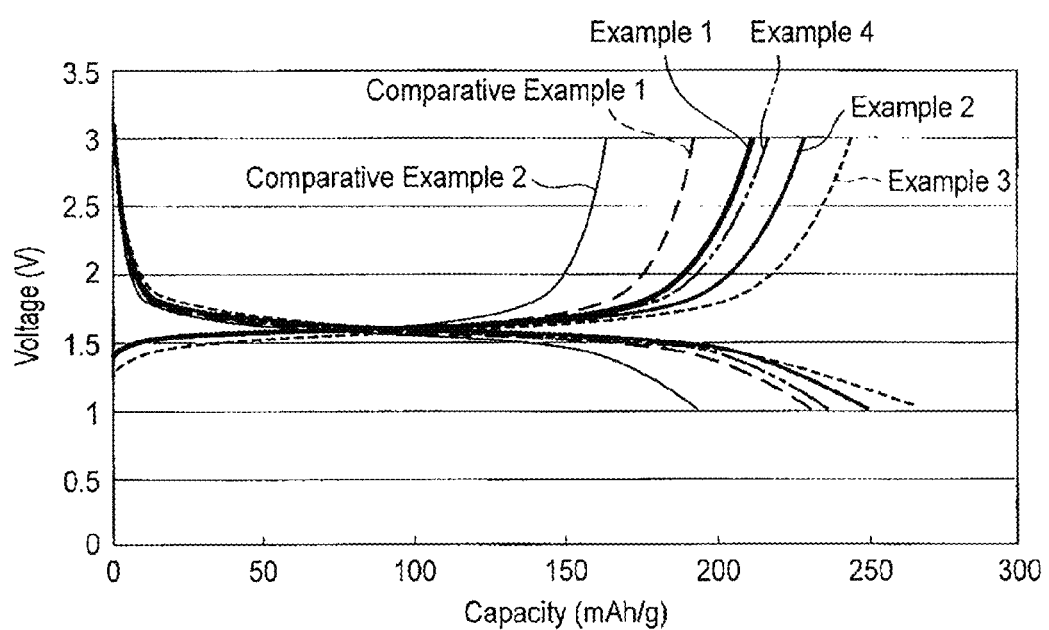
FIG. 11 is a graph showing the discharge curves of Examples and Comparative Examples.

Further, as shown in FIG. 11, the discharge curves of Examples 2 to 4 rise at around a capacity of more than 200 mAh/g. In contrast, the discharge curves of Comparative Examples 1 and 2 rise before the capacity reaches 200 mAh/g. These results show that Examples 2 to 4 had higher discharge capacities and better repetitive charge-discharge performances than those of Comparative Examples 1 and 2 that were synthesized according to the conventional methods.

Although the powder of compound was photographed by a high-resolution TEM and subjected to a FFT analysis in the present example, a similar analysis is possible by using an electrode. In an electrode that has been compressed by a press or the like, specific crystal planes are oriented on a same plane due to the form of a particle. Also in such case, the effect described in the present application can be obtained as long as a (020) plane is observed in a FFT analysis pattern and a spot is present in the range of 0.185 to 0.195 nm.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A negative electrode active material, consisting of a titanium oxide compound having a crystal structure of a monoclinic titanium dioxide, each of primary particles of the titanium oxide compound being composed of a plurality of crystallites, the crystallites each having a crystallite size of 5 to 25 nm when the crystallite size is calculated by using the half width of the peak of a (110) plane obtained by a powder X-ray diffraction method using a Cu—K$\alpha$ ray, wherein the negative electrode active material forms a negative electrode disposed within a nonaqueous electrolyte battery.

2. The negative electrode active material according to claim 1, wherein the titanium oxide compound has a spot in the range of 0.185 to 0.195 nm in a fast Fourier transform analysis pattern using a high-resolution transmission electron microscopic image.

3. A nonaqueous electrolyte battery, comprising:
   a positive electrode,
   a negative electrode comprising the negative electrode active material according to claim 1, and
   a nonaqueous electrolyte.

4. A battery pack comprising the nonaqueous electrolyte battery according to claim 3.

5. A method for the production of a negative electrode active material, comprising:
   obtaining an anisotropically-grown alkali titanate compound;
   exchanging an alkali cation of the alkali titanate compound for a proton by reacting the alkali titanate compound with an acid for 1 to 2 weeks while the acid solution is replaced with a fresh one to give a proton-exchanged compound; and
   subjecting the proton-exchanged compound to heat treatment at a temperature of 300 to 500° C. to give a titanium oxide compound having a crystal structure of a monoclinic titanium dioxide, each of primary particles of the titanium oxide compound being composed of a plurality of crystallites, the crystallites each having a crystallite size of 5 to 25 nm when the crystallite size is calculated by using the half width of the peak of a (110) plane determined by a powder X-ray diffraction method using a Cu—K$\alpha$ ray.

6. The method according to claim 5, wherein the acid solution is replaced every 24 hours.

7. A method for the production of a negative electrode active material, comprising:
   melting a raw material to give a molten product; bringing the molten product into contact with a cooling board to cool the molten product unidirectionally and thereby obtaining an anisotropically-grown crystal; and subjecting the crystal to heat treatment at a temperature of 850 to 1200° C. to give an anisotropically-grown alkali titanate compound;
   exchanging an alkali cation of the alkali titanate compound for a proton by reacting the alkali titanate compound with an acid for 1 to 2 weeks while the acid solution is replaced with a fresh one to give a proton-exchanged compound; and
   subjecting the proton-exchanged compound to heat treatment at a temperature of 300 to 500° C. to give a titanium oxide compound having a crystal structure of a monoclinic titanium dioxide, each of primary particles of the titanium oxide compound being composed of a plurality of crystallites, the crystallites each having a crystallite size of 5 to 25 nm when the crystallite size is calculated by using the half width of the peak of a (110) plane determined by a powder X-ray diffraction method using a Cu—K$\alpha$ ray.

8. The method according to claim 7, wherein the acid solution is replaced every 24 hours.

\* \* \* \* \*